United States Patent [19]

Ciolino et al.

[11] Patent Number: 4,803,008

[45] Date of Patent: Feb. 7, 1989

[54] CLEANING COMPOSITION CONTAINING A COLORANT STABILIZED AGAINST FADING

[75] Inventors: Laura A. Ciolino; Shaun F. Clancy, both of Cincinnati, Ohio

[73] Assignee: The Drackett Company, Cincinnati, Ohio

[21] Appl. No.: 99,922

[22] Filed: Sep. 23, 1987

[51] Int. Cl.[4] .......................... C09D 9/00; C11D 7/22; C11D 7/50

[52] U.S. Cl. .................................... 252/162; 252/170; 252/171; 252/172; 252/364; 252/397; 106/311; 8/904; 8/906; 8/907; 8/909; 424/150

[58] Field of Search ............... 252/162, 170, 171, 172, 252/364, 397; 106/311; 8/904, 906, 907, 909; 424/150

[56] References Cited

U.S. PATENT DOCUMENTS

| | | | |
|---|---|---|---|
| 3,214,380 | 10/1965 | Gangwisch | 252/100 |
| 3,338,837 | 8/1967 | Hodes | 252/106 |
| 3,503,885 | 3/1970 | Langenfeld | 252/105 |
| 3,558,263 | 1/1971 | Baitinger, Jr. | 8/116.3 |
| 4,298,491 | 11/1981 | Coxon et al. | 252/95 |
| 4,412,933 | 11/1983 | Klahr et al. | 252/174.19 |
| 4,427,566 | 1/1984 | Clemants | 252/102 |
| 4,526,701 | 7/1985 | Rubin | 252/113 |
| 4,606,842 | 8/1986 | Keyes et al. | 252/174.23 |

FOREIGN PATENT DOCUMENTS

| | | |
|---|---|---|
| 1183473 | 10/1985 | U.S.S.R. . |
| 1356336 | 6/1974 | United Kingdom . |

*Primary Examiner*—Paul Lieberman
*Assistant Examiner*—Ronald A. Krasnow
*Attorney, Agent, or Firm*—Sandra M. Person; Charles J. Zeller

[57] ABSTRACT

An aqueous cleaning composition comprising a surfactant; up to about 50% of a higher boiling solvent, typically an alkyl ether of an alkylene glycol, said solvent introducing impurities into the composition in an amount and of a nature normally chemically incompatible with oxidizable dye chromophores; a dye in an amount to provide a desired tinctorial value, and a stabilizer selected from the group consisting of salts suitable to provide iodide and thiosulfate anions in an amount effective to retard fading of the dye, said compositions having a basic pH when the stabilizer is the thiousulfate salt. In another aspect of the invention, the stabilizer incorporated into compositions containing a solvent, a surfactant, and water, and optionally a dye provides a beneficial cleaning result. In yet another aspect of the invention, the stabilizer beneficially retards the development of malodors when the compositions of the present invention are contained in a PVC container. Broadly, the incorporation of the stabilizer in said solvent can be employed to neutralize said impurities.

32 Claims, No Drawings

CLEANING COMPOSITION CONTAINING A COLORANT STABILIZED AGAINST FADING

FIELD OF INVENTION

This invention relates to cleaning compositions including both ready-to-use and water-dilutable concentrate type compositions, suitable for spray-and-wipe cleaning of hard surfaces, for example, glass, counter-tops, tile, and the like. More specifically, the present invention relates to such compositions comprising a surfactant, a solvent, and a colorant, there also being present in the composition materials such as solvent impurities in such concentration that the colorant has a tendency to fade over time, said composition further comprising a colorant stabilizer present in an amount effective to reduce substantially the rate at which the colorant fades. In addition, it has been found that the stabilizer provides a collateral cleaning benefit and also reduces the formation of malodors when the composition is contained in a plastic container.

BACKGROUND OF THE INVENTION

Spray-on-and-wipe-off cleaning compositions are well known in the art. See, for example, U.S. Pat. Nos. 3,463,735 to Stonebraker; 4,302,348 to Requejo, and 4,606,842 to Keyes, et al. The spray-on-and-wipe-off compositions of the prior art typically include a solvent, for example, a mixture of isopropyl alcohol and ethylene glycol monobutyl ether, a surfactant, for example, sodium lauryl sulfate; a builder, for example, tetrasodium polyphosphate or a water soluble polyacrylic acid resin; an alkalinity agent, for example, ammonium hydroxide and morpholine, or an acidity agent for example, acetic acid; adjuvants such as a dye and a perfume; and water. Compositions including the alkalinity agent typically have a pH of between about 8.5 to about 11.5, while compositions incorporating the acidity agent typically have a pH of from about 2.5 to about 6.5.

It has been found that there is a tendency of the colorant, most typically a water soluble dye, present in these known compositions to fade in such compositions. It is believed that the tendency for the colorant to fade is attributable to impurities present in the composition, primarily impurities associated with the glycol ether-type solvent, especially when such solvents are incorporated at higher concentrations. Concentrates of such compositions intended for dilution with water prior to use are especially susceptible to this dye fading problem. Fading of the colorant is not only unattractive to purchasers of the product, but makes the product less visible when applied to the surface to be cleaned. Accordingly, there is a definite need to at least substantially reduce the rate at which the colorant fades. It has been found that incorporation of iodide and thiosulfate anions in effective amount is satisfactory to stabilize the colorant in such compositions, the thiosulfate anions being suitable when the pH of the composition is neutral or basic.

Accordingly, it is an object of the present invention to provide a spray-on-and-wipe-off hard surface cleaning composition containing a colorant stabilized against color fading.

It is a further object of the present invention to provide such hard surface cleaning compositions, in concentrate or ready-to-use form, containing a level of a glycol ether solvent having a destabilizing concentration of dye-interactive impurities.

It is a further object of the present invention to provide such stabilized dye hard surface cleaning compositions wherein the stabilizer for the colorant is an alkali metal iodide.

It is yet another object of the invention herein described to provide such stabilized dye hard surface cleaning compositions wherein the stabilizer for the colorant is an alkali metal thiosulfate, the composition pH being neutral or basic.

Yet another object of the present invention is to provide hard surface cleaning compositions compatible with PVC containers.

An additional object of the present invention is to provide hard surface cleaning compositions exhibiting improved cleaning performance.

These and other objects and advantages of the present invention will be apparent upon a reading of the entire disclosure, a summary of which appears below.

SUMMARY OF THE INVENTION

The cleaning compositions of the present invention comprise on a weight basis up to about 50% of a higher boiling solvent, preferably a $C_1$–$C_4$ alkyl ether of a glycol having a total of from 3 to about 12 carbon atoms in the molecule, said solvent introducing impurities into the composition in an amount and of a nature normally chemically incompatible with oxidizable dye chromophores; a dye present in an amount to provide a desired tinctorial value and including oxidizable dye chromophores; a stabilizer selected from the group consisting of an iodide or thiosulfate salt suitable to provide said anion in solution in the composition in an amount effective to retard fading of the dye; a surfactant, and water. The composition has an acid, neutral or basic pH, a pH modifying agent being includable if needed to provide a predetermined composition pH, compositions containing the thiosulfate anion as the stabilizer, however, having a basic or neutral pH.

In another aspect of the present invention, the stabilizer is incorporated into compositions containing a solvent, preferably a higher boiling solvent or a solvent system containing a higher boiling and a lower boiling solvent; a surfactant, and water, and optionally a dye, the concentration of the stabilizer being effective to provide a cleaning benefit as compared to such composition not containing the stabilizer. Preferably in this aspect of the invention, the stabilizer concentration is from about 0.001 to about 0.10% by weight of the total composition.

In yet another aspect of the present invention, it has been found that the stabilizer beneficially retards the formation of malodors when the compositions of the present invention are contained in polyvinylchloride containers.

DETAILED DESCRIPTION OF THE PREFERRED EMBODIMENT

The spray-on-and-wipe-off hard surface cleaning compositions of the present invention comprise an organic solvent; a surfactant or surfactant mixture; a colorant, most typically a water soluble dye; a colorant stabilizer, and water. The compositions may have an acidic, neutral or basic pH, and may further include as optional ingredients one or more of the following: pH modifying agents, perfumes, builders, hydrotropes, chelating or sequestering agents, viscosity modifiers, and the like.

Organic solvents suitable for inclusion in hard surface cleaning compositions of the type under consideration herein include monohydric alcohols having 2 to 8 carbons; polyhydric alcohols, especially glycols having 2 to about 10 carbons; and $C_1$ to $C_4$ alkyl ethers of alkylene glycols and polyalkylene glycols, said glycol ethers having a total of from 3 to about 12 carbons. In many instances, it is preferred to incorporate a mixture of the lower boiling monohydric alcohols, especially such alcohols having from 2 to 6 carbons, and the higher boiling polyhydric alcohols or glycol ethers, to achieve a desired rate of evaporation of the composition from the work surface. In other instances a higher boiling solvent may be used singly or in combination with one or more other higher boiling solvents. Preferably, the higher boiling polyhydric alcohol or glycol ether solvents have a boiling point between about 120° to about 250° C.

Suitable monohydric (lower boiling) solvents include methyl alcohol, ethyl alcohol, n-propyl and isopropyl alcohols, n-butyl alcohol, etc. Typically, such solvents are not incorporated singly or in admixture one with the other, but rather are admixed with one or more higher boiling solvents as previously indicated. Suitable polyhydric alcohol solvents include ethylene glycol; propylene glycol; 1,2-butanediol; 1,3-butanediol; tetramethylene glycol, 1,2-pentanediol, pentamethylene glycol; and 1,6-hexanediol, while of the glycol ether solvents mention may be made of ethylene glycol monomethyl ether; ethylene glycol monoethyl ether; ethylene glycol monobutyl ether; propylene glycol monoethyl ether; propylene; glycol tertiary butyl ether; diethylene glycol monoethyl ether, diethylene glycol monobutyl ether; tripropylene glycol monomethyl ether; tetraethylene glycol dimethyl ether; β,β-dihydroxydiethyl ether (i.e., diethylene glycol); ethylene glycol di-(β-hydroxyethyl) ether (i.e., triethylene glycol); ethylene glycol monophenyl ether; and cyclohexyl ethyl ether. Especially suitable are glycol ethers having from 5 to 8 carbons in the molecule.

Preferred are ethylene glycol monobutyl ether; propylene glycol monobutyl ether; propylene glycol tertiary butyl ether, and tripropylene glycol monomethyl ether.

The solvent in ready-to-use compositions may be present in an amount of up to about 30% by weight of the composition, although solvent concentrations more typically range from about 2 to about 15% by weight of the composition, preferably from about 5 to about 15%, most preferably from about 7 to 12%. In concentrate composition intended to be diluted with water prior to use, the solvent may be present in an amount of up to about 50% by weight, the composition after dilution having a solvent concentration similar to that of the ready-to-use version. The concentrate compositions may be applied full strength for problem soils. The ready-to-use or the concentrate compositions subsequent to dilution should not contain in excess of the solubility limit of the solvent in the composition as a whole, as shaking of the composition is then necessary during use by the consumer. By blending of the low boiling, more water-soluble solvents, concentrations of the higher boiling solvents in excess of their water solubility may be achieved.

Observations of compositions containing a glycol ether as the solvent or one solvent in a solvent system have shown that colorants, e.g., dyes, included in the compositions have a tendency to fade over time, which fading tendency is aggravated as the concentration of the glycol ether in the compositions increases. Moreover, this fading problem is more manifest at elevated temperature conditions, such as may be encountered during warehouse storage at summer temperatures.

Consideration of possible causative factors for dye decolorization led to the belief that there might be impurities associated with the glycol ether type solvents which would react or otherwise interact with chromophore sites present in the dyes. Such mechanism is supported by the observation of more rapid fading of the dye as the concentration of the glycol ether solvents increased and by the fading rate increase as temperature increased.

Analysis of a commercial sample of ethylene glycol monobutyl ether indicated that various impurities were present, namely, butanol, butyl butal, 2-ethylhexene-2-ol, diethylene glycol mono-butyl ether, 2-hydroxyethyl butyrate, and butoxyacetic acid. These materials are attributable to reactants in the manufacture of the solvent by reaction of butanol with ethylene oxide; to by-products of the reaction, and to easily formed air degradation impurities. Treatment of ethylene glycol monobutyl ether with air at 100° C. to accelerate aging resulted in the formation of n-butyraldehyde, butylformate, 2-butoxy-acetaldehyde, 2-isobutoxyethanol and butyl butyrate. It is also believed that highly reactive peroxide species are also formed, most likely as a result of air degradation of the solvent. The peroxides may undergo further reaction to form other oxidizing species. Likely peroxide species include 1-(1-hydroperoxy-2-hydroxyethoxy)butane; 1-butoxy-2-hydroxy-1-ethyl peroxide; 1-(2-hydroxyethoxy)-1-hydroperoxy butane; and 1-(2-hydroxyethoxy)-1-butyl peroxide. In addition it is believed that similar classes of impurities may be present in the polyhydric alcohol solvent, especially such impurities formed by air degradation. Finally, additional solvent-associated impurities may be formed subsequent to composition manufacture, for example, upon exposure of the composition to the catalyzing effect of UV light, interaction with other components and impurities thereof, and at temperatures encountered during long-term summer storage.

Such impurities can be present in an amount of up to about 0.5% by weight of the solvent. Thus, the compositions of the present invention unavoidably include up to about 0.25% of these impurities, usually from about 0.001 to about 0.1%, by total weight of the composition, one or more of which are believed to be reactive or otherwise interactive with chromophores present in dyes commonly used in the compositions of the present invention.

Quite clearly, the concentration of the impurities reactive with the dye to occasion color loss does not need to be great, in view of the low concentration of the dye included generally in the composition, and the potentially protracted period of time between manufacture and use by the consumer.

By way of example, the initial tinctorial value of the compositions of the present invention is preferably not reduced by more than about 50% within about three months' storage at 100° F., most preferably, by not more than about 25% within about three months at 100° F. It is also desirable that the composition of the present invention retain at least about 50% of their original tinctorial value for about one month at 125° F.

The dyes included in the composition of the present invention are those which are subject to fading in the compositions of the present invention and which may be stabilized by the inclusion of the stabilizer of the present invention, as hereinafter considered. The dye is present in the composition in an amount effective to provide the composition with a desired color intensity or tinctorial value. Typically, the compositions of the present invention will have a dye concentration of from about 0.0001 to about 0.1%, preferably from about 0.0005 to about 0.01%, and most preferably from about 0.001 to about 0.005%, on an active dye basis. Generally, the dye level would be greater in the concentrate composition, or when the tinctorial value of the dye molecule is low.

Dyes found to fade in compositions of the present invention in the absence of the stabilizer constituent are FD&C Yellow No. 5 (Acid Yellow 23; Colour Index No. 19,140); Sandolan Yellow P5G (Acid Yellow 40:1; Colour Index No. 18,950:1); Hidacid Fast Light Yellow 2G (Acid Yellow 17; Colour Index No. 18,965); Nylosan Yellow N-7GL (Acid Yellow 218); Drimarene Briliant Green X3G (Reactive Green 12); Cibacron Yellow GA (Reactive Yellow No. 6); Pyrazol Fast Turquiose GLL (Direct Blue 86; Colour Index No. 74,180), and Basantol Green 910 (Acid Green 26).

Dyes fadable in the compositions of the present invention but not specifically mentioned herein may easily be screened for stabilization suitability in the compositions of the present invention. Other suitable dyes include FD&C Blue No. 1 (Colour Index No. 42,090) and Hidacid Aqua Blue (Colour Index No. 52,035).

It has been found that the inclusion of a small yet effective amount generally less than 1,000 ppm, especially less than 100 ppm, of an iodide or a thiosulfate anion reduces the aforementioned tendency of dyes present in the composition to fade and eventually decolorize, the thiosulfate anion, however, being suitable only in compositions having a neutral or basic pH. Suitable salts which may be incorporated that provide the requisite anion are the iodides of sodium, potassium, lithium, ammonium, calcium, magnesium, iron (II), barium, manganese (II), tin (IV), and zinc, especially sodium or potasium iodide. Suitable salts which may be incorporated that provide the thiosulfate anion include the thiosulfates of sodium, potassium, ammonium, calcium, barium, magnesium, and iron (II), especially sodium and potassium.

In addition to its utility as a dye stabilizer, it has also been found that the stabilizers of the present invention also reduce the development of off-odors. It is believed that the off-odors are due to interaction between the solvent and the polyvinyl chloride container for said composition or with a PVC additive such as a heat stabilizer, and secondarily to perfume degradation. Secondly, it has been found that the stabilizers also provide an improvement in cleaning performance on certain surfaces including glass and baked enamel, although the reason for the improved performance is not fully understood. Between about 0.001 to about 0.1%, preferably from about 0.001 to about 0.01%, is effective for this utility. If too much is present, a residue can occur on the surface being cleaned.

Anionic, nonionic, cationic, amphoteric, and zwitterionic surfactants are suitable in the composition of the present invention, and are present in an effective cleaning amount, typically from about 0.001 to about 5%, preferably in an amount of from about 0.01 to about 1.0%, most preferably from about 0.01 to about 0.1% by weight of the composition. Anionic and nonionic surfactants are especially preferred.

Broadly, the anionic surfactants are water-soluble alkyl or alkylaryl compounds, the alkyl having from about 8 to about 22 carbons, including a sulfate or sulfonate substituent group that has been base-neutralized, typically to provide an alkali metal, e.g., sodium or potassium, or an ammonium cation, including, for example: (1) alkyl and alkylaryl sulfates and sulfonates having preferably 8 to 18 carbons in the alkyl group, which may be straight or branched chain, e.g., sodium lauryl sulfate and sodium dodecylbenzene sulfonate; (2) alpha-olefin aryl sulfonates preferably having from about 10 to 18 carbons in the olefin, e.g., sodium $C_{14-16}$ olefin sulfonate, which is a mixture of long-chain sulfonate salts prepared by sulfonation of $C_{14-16}$ alpha-olefins and chiefly comprising sodium alkene sulfonates and sodium hydroxyalkane sulfonates; (3) sulfated and sulfonated monoglycerides, especially those derived from coconut oil fatty acids; (4) sulfate esters of ethoxylated fatty alcohols having 1–10 mols ethylene oxide, e.g., sodium polyoxyethylene (7 mol EO) lauryl ether sulfate, and of ethoxylated alkyl phenols having 10 mols ethylene oxide and 8 to 12 carbons in the alkyl, e.g., ammonium polyoxyethylene (4 mol EO) nonyl phenol ether sulfate; (5) base-neutralized esters of fatty acids and isethionic acid, e.g., sodium lauroyl isethionate; (6) fatty acid amides of a methyl tauride, e.g., sodium methyl cocoyl taurate; (7) β-acetoxy- or β-acetamido-alkane sulfonates, and (8) sarcosinates having from 8 to 22 carbons, e.g., sodium lauroyl sarcosinate.

The nonionics include (1) fatty alcohol alkoxylates, especially the ethoxylates, wherein the alkyl group has from 8 to 22, preferably 12 to 18, carbons, and typically 6 to 15 mol alkoxide per molecule, e.g., coconut alcohol condensed with about nine mols ethylene oxide; (2) fatty acid alkoxylates having from about 6 to about 15 mols alkoxylate, especially the ethoxylate; (3) alkylphenoxy alkoxylates, especially the ethoxylates, containing 6 to 12 carbons, preferably octyl or nonyl, in the alkyl, and having about 5 to 25, preferably 5 to 15 mols alkylene oxide per molecule, e.g., nonyl phenol ethoxylated with about 9.5 mols ethylene oxide (Igepal CO-630); (4) condensates of ethylene oxide with a hydrophobic base formed by condensation of propylene oxide with propylene glycol, e.g., nonionic surfactants of the Pluronic series manufactured by BASF Wyandotte, (5) condensates of ethylene oxide with an amine or amide; (6) fatty amine oxides, e.g., stearyl dimethyl amine oxide, and (7) alkylolamides.

Also suitable, alone or in combination with one or more other surfactants, are the specialty surfactants, e.g., silicone surfactants and fluorocarbon surfactants. Of the latter, mention may be made of the Fluorad FC series manufactured by 3 M Company and the Zonyl series manufactured by E. I. duPont. These surfactants are available in anionic, nonionic, cationic, and amphoteric form. A further discussion of these surfactants appears in U.S. Pat. Nos. 4,302,348 and 4,511,489, both to Requejo, incorporated herein by reference thereto. However, these surfactants are typically incorporated at low concentrations in the composition, usually at a level of less than about 0.1% by weight of the composition, in view of their powerful surface-active effect. Preferred in neutral and acidic media is Fluorad FC-171, a nonionic fluorosurfactant. Preferred in basic media is FC-129, an anonic fluorosurfactant. Of the silicone surfactants, mention may be made of Masil 280 manufactured by Mazer Chemicals and the Silwet series manufactured by Union Carbide, e.g., Silwets L-720 and L-7607, the silicone surfactants being incorporated at about the same levels as conventional surfactants.

Preferred anionics are the alkyl and alkylaryl sulfates and the alpha-olefin aryl sulfonates, while preferred nonionics are the fatty alcohol ethoxylates.

As previously mentioned, optional adjuvants may be incorporated in the compositions of the present invention in an amount effective to obtain the intended function, typically in an amount of less than about 1%. Such adjuvants include acidifying agents such as acetic acid, citric acid, and other mono and dicarboxylic acids, and mineral acids such as hydrochloric acid and phosphoric acid, preferably in an amount to provide a ph between about 2.5 and 5.5; alkalinity agents such as ammonium hydroxide, morpholine, sodium hydroxide, and alkanolamines, preferably in an amount to provide a pH between about 8 and 11; builders such as tetrasodium, pyrophosphate and low molecular weight polyacrylic acid and salts thereof; sequestering agents such as EDTA and NTA; hydrotropes, for example, sodium xylene sulfonate and $C_{21}$ dicarboxylic acids sold under the Diacid TM trade name by Westvaco, and viscosity modifiers such as cellulose derivatives, clays and gums.

The compositions of the present invention are made by a mixture of the various ingredients. However, it is preferred to dissolve the stabilizer in the aqueous portion prior to addition of the organic solvent.

The present invention is further illustrated by the examples which follow

EXAMPLE 1

The following compositions A to H and AA to HH were prepared:

TABLE I

| Constituent | Concentration, wt. % A to H | AA to HH |
|---|---|---|
| Ethylene glycol n-butyl ether(1) | 10.0 | 10.0 |
| Sodium dodecyl benzene sulfonate | 0.047 | 0.047 |
| Fluorad FC-171(2) | 0.01 | 0.01 |
| Acetic acid | 0.05 | 0.05 |
| Dye | <<< Per Table II >>> | |
| Potassium Iodide | 0.003 | 0 |
| Perfume | 0.01 | 0.01 |
| Water | Q.S. | Q.S. |

(1)Ektasolve EB manufactured by Eastman Chemicals Company.
(2)100% active nonionic fluorocarbon surfactant manufactured by 3M Company.

The dyes included in the compositions of Table I are identified below in Table II. The pH of these compositions was about 4.

TABLE II

| Composition | Dye I.D. No. | Concentration, wt. % |
|---|---|---|
| A, AA | 1 | 0.00083 |
| B, BB | 2 | 0.002 |
| C, CC | 3 | 0.002 |
| D, DD | 4 | 0.00026 |
| E, EE | 5 | 0.0043 |
| F, FF | 6 | 0.0008 |
| G, GG | 7 | 0.002 |

TABLE II-continued

| Composition | Dye I.D. No. | Concentration, wt. % |
|---|---|---|
| H, HH | 8 | 0.002 |

1. Hidacid Fast Light Yellow 2G manufactured by Hilton-Davis Company (C.I. No. 18,965; Acid Yellow 17).
2. Nylosan Yellow N-7GL manufactured by Sandoz Chemicals, Inc. (Acid Yellow 218).
3. Sandolan Yellow P5G manufactured by Sandoz Chemicals, Inc. (Acid Yellow 40:1).
4. FD & C Yellow No. 5 manufactured by Hilton-Davis Company (C.I. No. 19,140; Acid Yellow 23).
5. Drimarene Brilliant Green X-3G manufactured by Sandoz Chemicals, Inc. (Reactive Green 12).
6. Pyrazol Fast Turquoise GLL manufactured by Sandoz Chemicals, Inc. (C.I. No. 74,180; Direct Blue 86).
7. Basantol Green 910 manufactured by BASF Wyandotte Corp. (Acid Green 26).
8. Cibacron Yellow GA manufactured by Ciba-Geigy Corp. (Reactive Yellow No. 6).

From Tables I and II, it is seen that compositions A, AA; B, BB; C, CC; etc., are paired sets, each composition in a set incorporating the same dye at the same concentration, the compositions A to H within the scope of the present invention including 30 ppm of the potassium iodide and the compositions AA to HH outside the scope of the present invention being potassium iodide free formulas.

The paired compositions A, AA; B, BB; C, CC; etc., were evaluated for dye stability. Samples of each composition were placed in polyvinyl chloride bottles, two samples of each composition being stored at 100° F. for 90 days and two of each composition being stored at 125° F. for 28 days. Absorbance measurements were made initially and at the end of the storage period. The results of these evaluations are reported in Table III, as an average of the two samples for each test composition.

TABLE III

| Composition | Storage in PVC Initial Absorbance* | Percent Absorbance Remaining After 90 Days | After 28 Days |
|---|---|---|---|
| A | 0.312 | 81.1 | 92.0 |
| AA | 0.305 | 1.31 | 14.4 |
| B | 0.314 | 77.1 | 73.6 |
| BB | 0.310 | 1.29 | 14.2 |
| C | 0.419 | 86.6 | 83.8 |
| CC | 0.412 | 5.83 | 11.9 |
| D | 0.167 | 76.6 | 87.4 |
| DD | 0.173 | 27.7 | 14.5 |
| E | 1.151 | 34.8 | 26.9 |
| EE | 1.185 | 0.25 | 1.43 |
| F | 0.166 | 5.42 | 6.63 |
| FF | 0.161 | 0.62 | 3.73 |
| G | 0.463 | 28.3 | 34.6 |
| GG | 0.435 | 2.76 | 3.91 |
| H | 0.385 | 85.7 | 89.1 |
| HH | 0.376 | 1.33 | 4.52 |

*Absorbance measurements were made at 410 nm for compositions A to D; AA to DD; H and HH. Absorbance measurements for compositions E to G and EE to GG were made at 660 nm.

Similar evaluations of dye stability were conducted in glass containers, the results being set forth in Table IV below.

TABLE IV

| Composition | Storage in Glass Absorbance* | Percent Absorbance Remaining After 90 Days | After 28 Days |
|---|---|---|---|
| A | 0.312 | 93.3 | 85.6 |
| AA | 0.305 | 69.5 | 10.8 |
| B | 0.314 | 92.4 | 86.9 |
| BB | 0.310 | 68.4 | 10.6 |
| C | 0.419 | 94.3 | 89.3 |
| CC | 0.412 | 67.2 | 8.98 |

TABLE IV-continued

| | Storage in Glass | | |
|---|---|---|---|
| | | Percent Absorbance Remaining | |
| Composition | Absorbance* | After 90 Days | After 28 Days |
| D | 0.167 | 99.4 | 82.6 |
| DD | 0.173 | 20.8 | 17.3 |
| E | 1.151 | 34.7 | 34.3 |
| EE | 1.185 | 1.7 | 2.53 |
| F | 0.166 | 19.3 | 21.1 |
| FF | 0.161 | 12.4 | 18.6 |
| G | 0.463 | 32.2 | 40.2 |
| GG | 0.435 | 6.44 | 9.2 |
| H | 0.385 | 97.1 | 91.2 |
| HH | 0.376 | 11.1 | 10.4 |

*Absorbance measurements were made at the same wavelengths as in Table III.

EXAMPLE 2

The following compositions* were prepared.

TABLE V

| Constituent | Concentration, wt. % b J | JJ |
|---|---|---|
| Ethylene glycol n-butyl ether(1) | 22.0 | 22.0 |
| Isopropyl alcohol | 8.0 | 8.0 |
| Sodium lauryl sulfate | 0.45 | 0.45 |
| Ammonia as $NH_3$ | 0.13 | 0.13 |
| Pyrazol Fast Turquoise GLL | 0.0032 | 0.0032 |
| Potassium iodide | 0.0068 | 0 |
| Perfume | 0.08 | 0.08 |
| Water | Q.S. | Q.S. |

(1)Ektasolve EB.

The paired compositions J, JJ were tested for stability in PVC and glass containers, in accordance with Example 1. Absorbance readings were made at 660 nm. It is noted that in this example, in view of the high ethylene glycol n-butyl ether level, peak absorbance occurs at 670 nm. However, the data set forth in Table VI is suitable to assess the stability of the dye following storage as compared to the initial absorbance values. The pH of these compositions was about 11.

TABLE VI

| | | Percent Absorbance Remaining | |
|---|---|---|---|
| Composition | Absorbance | After 90 Days | After 28 Days |
| PVC: | | | |
| J | 1.68 | 90.5 | 83.9 |
| JJ | 1.68 | 51.7 | 51.3 |
| Glass: | | | |
| J | 1.68 | 88.7 | 98.7 |
| JJ | 1.68 | 82.1 | 50.5 |

*The letter I has not been used to identify compositions, to avoid confusion.

EXAMPLE 3

Compositions K and KK were prepared. Composition K was the same as composition J, except 0.0065% sodium thiosulfate was incorporated in lieu of 0.0068% potassium iodide. In both compositions K and KK, the amount of water was Q.S. 100%.

Stability tests were conducted in accordance with Examples 1 and 2, with absorbance measurements taken at 660 nm, except that storage was conducted only at 125° F. for 28 days in PVC and glass containers. In PVC containers 75.8% absorbance remained for composition K versus 51.3% absorbance remaining for composition KK. Similarly, in glass containers 75.1% absorbance remained for composition K versus 50.5% absorbance remaining for composition KK.

EXAMPLE 4

The compositions of the present invention were evaluated for their ability to control the formation of off-odors when contained in a PVC container. The following compositions were prepared:

TABLE VII

| | Concentration, wt. % | |
|---|---|---|
| Constituent | J to L | JJ to LL |
| Ethylene glycol n-butyl ether(1) | 10.0 | 10.0 |
| Sodium dodecyl benzene sulfonate | 0.047 | 0.047 |
| Fluorad FC-171 | 0.01 | 0.01 |
| Acetic acid | 0.05 | 0.05 |
| Dye: | | |
| Drimarene Brilliant Green X-3G | 0.0043 | 0.0043 |
| Pyrazol Fast Turquoise GLL | 0.0002 | 0.0002 |
| Potassium Iodide | 0.003 | 0 |
| Perfume | <<<Per Table VIII >>> | |
| Water | Q.S | Q.S. |

(1)Ektasolve EB

TABLE VIII

| Composition | Perfume | Concentration, wt. % |
|---|---|---|
| L, LL | — | — |
| M, MM | Perfume No. 1 | 0.01 |
| N, NN | Perfume No. 2 | 0.01 |

The compositions L to N and LL to NN were placed in PVC containers and stored at 140° F. for one week, after which panelists were required, in blind comparisons, to select the paired test container with the most off-odor. The results are set forth in Table IX.

TABLE IX

| Composition | Most Off-Odors No. of Judgments |
|---|---|
| L | 0 |
| LL | 40 |
| M | 0 |
| MM | 40 |
| N | 0 |
| NN | 40 |

EXAMPLE 5

The compositions E, EE and H, HH were comparatively tested with respect to cleaning performances.

A test surface to be cleaned was soiled uniformly and thereafter divided into equal sections. One section was cleaned with the composition of the present invention; the other section with the composition outside the scope of the present invention. Cleaning was conducted by applying a uniform spray of the cleaner to the section, allowing the cleaner to contact the soil for 30 seconds, and then wiping the section with a lint free cloth for 10 cycles and changing to a dry cloth for 10 additional cycles on a Gardener Washability Machine. Panelists were then required to select the cleaner section of the pair in a blind comparison. The results are tabulated in Table X.

TABLE X

| Composition | Surface | Soil | Cleaner Side No. of Judgments |
|---|---|---|---|
| E | Glass | Fed. Spec. Soil | 41 |
| EE | | P-G-406D* | 19 |
| H | Glass | Fed. Spec. Soil | 38 |
| HH | | P-G-406D | 32 |
| H | Baked Enamel | Fed. Spec. Soil | 46 |

TABLE X-continued

| Composition | Surface | Soil | Cleaner Side No. of Judgments |
|---|---|---|---|
| HH | | P-G-406D | 14 |

*CSMA Designation DDC-09, May 1983.

The above detailed description is not intended to be limiting of the scope of the invention as provided in the claims appended below, wherein all recited concentrations are on an active constituent basis.

We claim:

1. A cleaning composition comprising on a weight basis from about 2 to about 50% of a $C_1$-$C_4$ alkyl ether of alkylene and polyalkylene glycols, said glycol ethers having a total of from about 3 to about 12 carbons and introducing impurities into the composition in an amount and of a nature normally chemically incompatible with oxidizable dye chromophores; from about 0.0001 to about 0.1% by weight of a dye including oxidizable dye chromophores; from about 0.001 to about 0.1% by weight of an iodide salt stabilizer in an amount effective to retard fading of the dye; from about 0.001 to about 5% by weight of a surfactant; and water, said composition having a basic of neutral pH when the stabilizer is the thiosulfate salt.

2. The composition of claim 1 wherein the stabilizer is a salt of a sodium, potassium, ammonium, calcium, magnesium, barium, or iron (II) cation.

3. The composition of claim 1 wherein the glycol ether is present in an amount of from about 5 to about 30% by weight of the composition.

4. The composition of claim 3 wherein the impurities are present in an amount of from about 0.001 to about 0.1% by weight of the composition.

5. The composition of claim 3 wherein the glycol ether is selected from the group consisting of ethylene glycol monobutyl ether; propylene glycol monoethyl ether; diethylene glycol monoethyl ether; diethylene glycol monobutyl ether; tripropylene glycol monomethyl ether; tetraethylene glycol dimethyl ether; β,β-dihydroxydiethyl ether, and ethylene glycol di-β-hydroxyethyl ether.

6. The composition of claim 6 wherein the dye is selected from the group consisting of Colour Index Nos. 19,140; 18,950:1; 18,965; 74,180; 42,090; 52,035; Acid Yellow 218; Reactive Green 12; Reactive Yellow No. 6; and Acid Green 26.

7. The composition of claim 1 further comprising a pH modifying agent in an amount effective to provide a desired pH.

8. The composition of claim 7 wherein the pH modifying agent is an acidifying agent which is a low molecular weight carboxylic acid.

9. The composition of claim 8 wherein the acid is acetic acid.

10. The composition of claim 8 wherein the pH is between about 2.5 to about 5.5.

11. The composition of claim 8 wherein the pH modifying agent is an alkalizing agent which is a hydroxide base.

12. The composition of claim 11 wherein the base is ammonia.

13. The composition of claim 11 wherein the pH is between about 8.5 to about 11.

14. A cleaning composition comprising on a weight basis from about 5to about 15% of a $C_1$-$C_4$ alkyl ether of alkylene and polyalkylene glycols, said glycol ethers having a total of from 3 to 12 carbons and introducing impurities into the composition in a amount and of a nature normally incompatible with oxidizable dye chromophores; from about 0.0001 to about 0.10% dye, said dye including oxidizable dye chromophores; an iodide salt in an amount of less than about 1000 ppm, the iodide being in an amount effective to retard fading of the dye; from about 0.001 to about 5% of a surfactant selected from the group consisting of anionic and nonionic surfactants, and water.

15. The composition of claim 14 wherein the iodide is a salt of a sodium, potassium, or ammonium cation.

16. The composition of claim 14 wherein the glycol ether is present in an amount of from about 7 to about 12% by weight of the composition.

17. The composition of claim 14 wherein the impurities are present in an amount of from about 0.001 to about 0.1% by weight of the composition.

18. The composition of claim 14 or 17 wherein the $C_1$-$C_4$ alkyl ether of a glycol is selected from the group consisting of ethylene glycol monobutyl ether; propylene glycol monoethyl ether; diethylene glycol monoethyl ether; diethylene glycol monobutyl ether; tripropylene glycol monomethyl ether; tetraethylene glycol dimethyl ether; β,β-dihydroxydiethyl ether; and ethylene glycol di-(β-hydroxyethyl) ether.

19. The composition of claim 14 wherein the dye is present in an amount of from about 0.0005 to about 0.01 by weight of the composition, the dye being on an active basis.

20. The composition of claim 19 wherein the dye is selected from the group consisting of Colour Index Nos. 19,140; 18,950:1; 18,965; 74,180; 42,090; 52,035; Acid Yellow 218; Reactive Green 12; Reactive Yellow No. 6; and Acid Green 26.

21. The composition of claim 14 further comprising a pH modifying agent in a amount effective to provide a desired pH.

22. The composition of claim 21 wherein the pH modifying agent is an acidifying agent.

23. The composition of claim 22 wherein the acid is acetic acid.

24. The composition of claim 14 or 23 wherein the pH is between about 2.5 to about 5.5.

25. The composition of claim 21 wherein the pH modifying agent is an alkalizing agent.

26. The composition of claim 25 wherein the alkalizing agent is ammonia.

27. The composition of claim 14 or 26 wherein the pH is between about 8.5 to about 11.

28. The composition of claim 4, 14, 17, or 20 wherein the impurities include one or more of the following: butyl butal; 2-hydroxyethyl butyrate; butoxyacetic acid; n-butraldehyde; butyl formate; 2-butoxyacetaldehyde; 1-(1-hydroperoxy-2hydroethoxy)butane; 1-butoxy-2-hydroxy-1-ethyl peroxide; 1-(2- hydroxyethoxy)-1-hydroperoxy butane; and 1-(2-hydroxyethoxy)-1butyl peroxide.

29. The composition of claim 14 wherein the surfactant is present in an amount of from about 0.01 to about 1%.

30. The composition of claim 14 wherein the surfactant is a fluorocarbon surfactant present in an amount of less than about 0.1% of the total composition.

31. The composition of claim 14 wherein the surfactant is a surfactant mixture including a fluorocarbon surfactant present in an amount of less than about 0.1% of the total composition.

32. The composition of claim 29 or 31 wherein the surfactant is selected from the group consisting of sodium dodecyl benzene sulfonate and sodium lauryl sulfate.

* * * * *

UNITED STATES PATENT AND TRADEMARK OFFICE
CERTIFICATE OF CORRECTION

PATENT NO. : 4,803,008

DATED : February 7, 1989

INVENTOR(S) : L. A. Ciolino and S. F. Clancy

It is certified that error appears in the above-identified patent and that said Letters Patent is hereby corrected as shown below:

In the Abstract

Line 11, "thiousulfate" should read --thiosulfate--.
Column 3, line 34, the semicolon [,] immediately after "propylene" should be read immediately after "glycol" (first occurrence in the line).

Column 7, line 16, "ph" should read --pH--.

Column 7, line 22, the comma [,] immediately after "tetrasodium" should be deleted.

Column 11, Claim 1, line 24, after "basic", the word "of" should read --or--.

Column 11, Claim 6, line 42, after "claim", "6" should read --1--.

Column 11, Claim 11, line 56, after "claim", "8" should read --7--.

Column 12, Claim 29, line 56, immediately after "1%", the phrase --of the total composition-- should be read.

Signed and Sealed this

Seventeenth Day of October, 1989

Attest:

DONALD J. QUIGG

Attesting Officer

Commissioner of Patents and Trademarks